March 24, 1936.  O. C. DENNIS  2,035,147
ELECTRIC FRYING PAN
Filed March 5, 1934
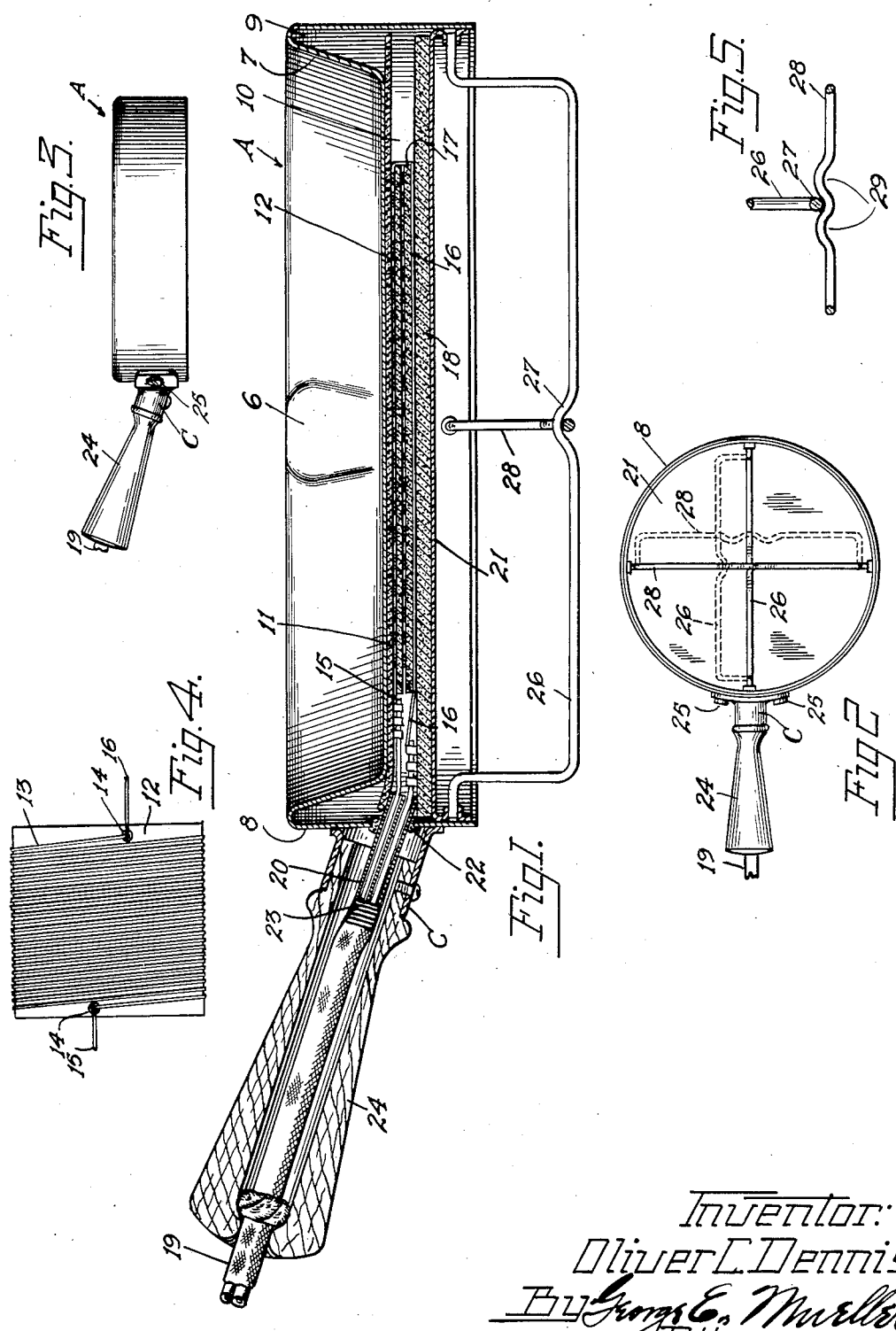
Inventor:
Oliver C. Dennis.
By George E. Mueller
Atty Patented Mar. 24, 1936

2,035,147

UNITED STATES PATENT OFFICE 2,035,147

ELECTRIC FRYING PAN

Oliver C. Dennis, Wilmette, Ill.

Application March 5, 1934, Serial No. 714,068

5 Claims. (Cl. 219—44)

My invention relates to electric frying pans and has to do more particularly with the small portable type for ordinary household use.

One of the objects of my invention is to produce a pan of the above character which is simple in construction, comparatively light in weight, cheap to manufacture, efficient in operation and water-proof in construction. There are certain features which will be apparent from the illustration and ensuing part of the specification and appended claims.

Referring now to the drawing:

Fig. 1 is a transverse sectional view of my improved construction;

Fig. 2 is a bottom plan view of Fig. 1;

Fig. 3 is a side elevation of the pan;

Fig. 4 is a detail view of the heating element; and

Fig. 5 is a view of the interconnecting portions of the wire base or stand.

Referring now more in detail to the construction as illustrated, I provide a pan A formed up of sheet metal having the central depressed portion 7 with a spout 6 depressed in the side wall thereof, and an annular outside rim 8 all drawn and formed up from a single sheet. In forming the pan, an annular chamber 9 is provided which is positioned between the wall of the inner pan and the outer wall or rim 8, thereby providing an insulating or air chamber which keeps the outer wall heat insulated from the pan portion.

By the depending portion or outer rim 8 I provide a chamber 10 within which the heating element is supported. This heating element is suitably insulated against electrical and direct heat contact with the metal parts of the pan also being sealed within the chamber 10 so as to be water-proof. To this end, I provide a circular disk 11 of insulating material such as sheet asbestos and against this I apply a heating element 12 made up of a sheet 12 of insulating material such as asbestos on which is wound a strip of ribbon resistance material 13 which is passed through eyelets 14 at the opposite ends of the sheet and thus secured thereto. This heating element is provided with a short terminal 15 adapted to pass directly out to the lead-in wires, and a long terminal 16 which passes downwardly and then underneath another sheet 17 of asbestos to a point adjacent the short terminal 15. I then apply a heavier sheet 18 of insulating material such as sheet asbestos, this being in the form of a circular plate, the same as plate 11. Before sealing these parts within the chamber 10 however, and in fact before the covering plate 18 is placed therein, I connect the lead-in conductors of the cord 19 to the terminals 15 and 16, first passing these lead-in terminals through a suitable insulating tube 20 preferably of porcelain. The terminals 15, 16 of the heating element and the lead-in conductors of the cord are then suitably fastened together, and soldered as indicated in the drawing. The porcelain tube 20 is inserted through an opening in the outer rim of the pan as indicated in the drawing so as to insulate the conductors from electrical contact with the metal parts.

After the parts have thus been assembled and the plate 18 placed within the chamber 10, I insert a cupped sheet metal bottom 21 into the bottom of the pan, this bottom member fitting tight within the pan and when pressed therein it seals the inside of the pan and makes it water and air tight. In pressing this bottom 21 into the pan, it is pushed in far enough to press all of the elements 11, 12, 17 and 18 bringing them into intimate contact so as to secure the most effective operation of the heating element, and may be spot welded together.

After the bottom 21 has been pressed in place, I apply a suitable heat and water-proof cement 22 around the insulating tube 20 so as to seal the opening through which this tube passes. I then also seal the end 23 by insulating compound or tape.

Thus the heating element is fixedly secured within an air tight chamber inside the pan, being pressed therein, and thus retaining all of the heat inside the chamber around the frying pan 7.

I now place a handle 24 around the cord 19 and fasten the ferrule C to the pan in a suitable manner preferably by screws 25. In order to keep the bottom of the pan clear of any base upon which it may rest, I provide a folding stand consisting of a pair of wire elements which are pivotally supported in the bottom of the pan. To this end two such wire elements are provided being shown in their outer or resting position in Figs. 1 and 2 but adapted to be folded inside the bottom 21 as indicated by the dotted lines in Fig. 2. As to this base the one element or member 26 has its ends sprung into eyelets formed out of the wall of the bottom 21 with a central displaced portion 27 adapted to lockingly receive the bottom of the other element 28 which is likewise pivotally supported in eyelets in the bottom 21. This member 28 has a double bent portion 29 adapted to hold the central portion 27 of the other leg to keep it against lateral movement when these rods are pulled outwardly from resting position. By this arrangement the wire legs may be normally held up inside the bottom 21 but when it is desired to bring them out for use, it is only necessary to grasp the wire 26 and pull outwardly on it whereby the other wire 28 follows it until the parts are interlocked as indicated in Fig. 5. By this arrangement this base may be normally kept inside of the bottom thus making it more compact for shipping or storage. It may be readily pulled out into position and also readily restored into the bottom.

What I claim is new and desire to protect by Letters Patent of the United States is:—

1. An electric frying pan comprising a one-piece body member having a frying pan portion and an outer rim extending downwardly from the upper peripheral edge of the pan portion, a heating element with insulating means therefor positioned beneath the pan portion, a closure member for pressing upwardly within the rim portion to maintain said heating element in heating relation to the pan, and upwardly a distance to provide an open chamber below the closure member.

2. An electric frying pan comprising a one-piece body member having a frying pan portion and an outer rim extending downwardly from the upper peripheral edge of the pan portion, a heating element with insulating means therefor positioned beneath the pan portion, a closure member for pressing upwardly within the rim portion to maintain said heating element in heating relation to the pan, and upwardly a distance to provide an open chamber below the closure member, and a relatively thick layer of heat insulating material positioned between said closure member and said insulated heating element.

3. An electric frying pan comprising a frying pan with an outer rim extending downwardly beneath the pan bottom to form a heating chamber beneath the pan, and a pair of crossed wire base forming members each having opposite ends pivotally secured to the inner wall of the rim within the chamber whereby said members may be moved into the chamber or out of the chamber to provide a base, said members being shaped to yieldingly interlock when acting as a base.

4. An electric frying pan comprising a one-piece body member having a frying pan portion and an outer rim extending downwardly from the upper peripheral edge of the pan portion, a heating element with insulating means therefor positioned beneath the pan portion, a closure member for pressing upwardly within the rim portion to maintain said heating element in heating relation to the pan, and upwardly a distance to provide an open chamber below the closure member, and a collapsible stand for said pan carried in said chamber.

5. An electric frying pan comprising a frying pan with an outer rim extending downwardly beneath the pan bottom to form an enlarged chamber beneath the pan, a heating element and insulating plates on top and bottom thereof, a closure member for said chamber pressed therein against the inner wall of the rim and frictionally engaging same to hold said heating element and insulating plates pressed tightly against the pan bottom, with said closure member pressed into said chamber a distance to provide an annular ring portion of the rim below said member, and a pair of crossed wire stand forming members pivotally carried by said ring portion in a position to collapse above the lower peripheral edge of the ring.

OLIVER C. DENNIS.